(12) United States Patent
Hanf et al.

(10) Patent No.: US 10,604,440 B2
(45) Date of Patent: Mar. 31, 2020

(54) METHOD FOR THE DEFINED SEPARATION OF A GLASS LAYER ON AN INNER WALL OF A PREFORM AND PREFORM AND COMMUNICATION SYSTEM

(71) Applicant: J-FIBER GMBH, Jena (DE)

(72) Inventors: Robert Hanf, Eisenberg (DE); Christian Genz, Jena (DE); Lothar Brehm, Jena (DE)

(73) Assignee: J-FIBER GMBH, Jena (DE)

( * ) Notice: Subject to any disclaimer, the term of this patent is extended or adjusted under 35 U.S.C. 154(b) by 171 days.

(21) Appl. No.: 15/743,673

(22) PCT Filed: Jul. 13, 2016

(86) PCT No.: PCT/DE2016/100311
§ 371 (c)(1),
(2) Date: Jan. 11, 2018

(87) PCT Pub. No.: WO2017/016539
PCT Pub. Date: Feb. 2, 2017

(65) Prior Publication Data
US 2018/0201536 A1    Jul. 19, 2018

(30) Foreign Application Priority Data

Jul. 29, 2015 (DE) .................. 10 2015 112 382

(51) Int. Cl.
*C03B 37/018* (2006.01)
*C03B 37/025* (2006.01)

(52) U.S. Cl.
CPC .. *C03B 37/01807* (2013.01); *C03B 37/01861* (2013.01); *C03B 37/0253* (2013.01); *C03B 2203/26* (2013.01); *C03B 2207/70* (2013.01)

(58) Field of Classification Search
CPC ............ C03B 37/018; C03B 37/01807; C03B 37/0183
See application file for complete search history.

(56) References Cited

U.S. PATENT DOCUMENTS 4,140,505 A * 2/1979 Ramsay ................ C03B 37/018
385/124
4,292,341 A * 9/1981 Marcuse ........... C03B 37/01413
427/10
(Continued)

FOREIGN PATENT DOCUMENTS

DE        600 00 283 T2      3/2003
DE        602 17 605 T2     10/2007
(Continued)

*Primary Examiner* — Cynthia Szewczyk
(74) *Attorney, Agent, or Firm* — Norman B. Thot

(57) ABSTRACT

A method for a defined deposition of a glass layer on an inner wall of a preform for an optical fiber and/or for setting a refractive index profile of the preform for a multi-mode fiber. The method includes providing the preform having a cavity and an inner wall which defines an inner diameter of the preform, and spreading a deposition gas at a flow speed (v) in the cavity of the preform so as to provide the defined deposition of the glass layer. The defined deposition is performed at a reduced change in the flow speed a*Δv, where a<1. Based on the defined deposition, a change in the flow speed (Δv):

$$\Delta v = \frac{4Q}{\pi} \cdot \left( \frac{1}{d_i^2} - \frac{1}{d_{i+1}^2} \right)$$

forms at a volume flow (Q), a first diameter ($d_i$), and a second diameter ($d_{i+1}$).

12 Claims, 1 Drawing Sheet

(56) References Cited

U.S. PATENT DOCUMENTS

| | | | |
|---|---|---|---|
| 4,335,934 A | * | 6/1982 | Black .................... C03B 37/018 |
| | | | 385/127 |
| 4,635,314 A | | 1/1987 | Peckman et al. |
| 4,813,989 A | | 3/1989 | Uchiyama et al. |
| 4,857,091 A | | 8/1989 | Geittner et al. |
| 2002/0076493 A1 | | 6/2002 | de Fouw et al. |
| 2003/0061990 A1 | | 4/2003 | Shay |
| 2003/0115909 A1 | | 6/2003 | House et al. |
| 2006/0107698 A1 | * | 5/2006 | Kim .................. C03B 37/01807 |
| | | | 65/489 |
| 2006/0185398 A1 | | 8/2006 | Kim et al. |
| 2007/0175242 A1 | | 8/2007 | Hirano et al. |
| 2011/0044596 A1 | | 2/2011 | Zhang et al. |
| 2013/0081430 A1 | | 4/2013 | Oozeki et al. |

FOREIGN PATENT DOCUMENTS

| | | |
|---|---|---|
| EP | 0 264 154 A2 | 4/1988 |
| EP | 1 719 739 A1 | 11/2006 |
| JP | 58-64236 A | 4/1983 |
| JP | 60-137840 A | 7/1985 |
| JP | 62-12181 B2 | 3/1987 |
| JP | 3052418 B2 | 4/2000 |

\* cited by examiner

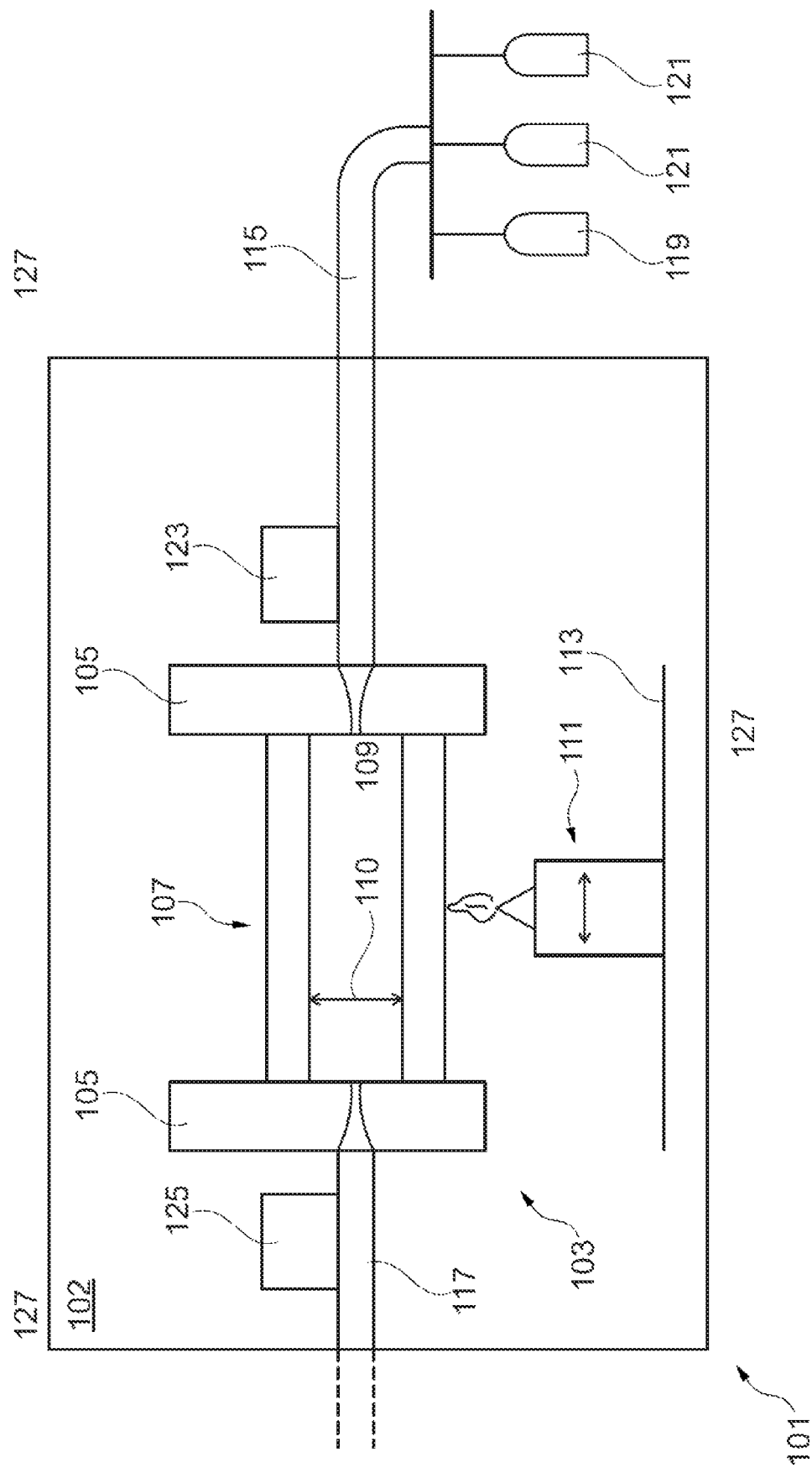

METHOD FOR THE DEFINED SEPARATION OF A GLASS LAYER ON AN INNER WALL OF A PREFORM AND PREFORM AND COMMUNICATION SYSTEM

CROSS REFERENCE TO PRIOR APPLICATIONS

This application is a U.S. National Phase application under 35 U.S.C. § 371 of International Application No. PCT/DE2016/100311, filed on Jul. 13, 2016 and which claims benefit to German Patent Application No. 10 2015 112 382.7, filed on Jul. 29, 2015. The International Application was published in German on Feb. 2, 2017 as WO 2017/016539 A1 under PCT Article 21(2).

FIELD

The present invention relates to a method for the defined deposition of a glass layer on an inner wall of a preform/blank mold for an optical fiber and/or for setting a refractive index profile of a preform/blank mold for a multi-mode fiber, wherein a deposition gas is guided at a flow speed (v) in a cavity of the preform/blank mold formed by the inner wall. The present invention also relates to a glass fiber and to a communication system.

BACKGROUND

U.S. Pat. No. 4,813,989 describes a method for a closed-loop control of a diameter. A defined amount of gas is here blown into a pressure control chamber via a blower in order to influence the pressure conditions in the tube so that the outer diameter of the tube remains constant during the internal deposition.

JP 62012181 describes a method where pressure regulation is used in only one direction. The pressure is correspondingly maintained constant in the return flow. Regulating the pressure in the forward flow also aims at maintaining a constant outer diameter.

JP 3052418 describes a method for maintaining a constant internal pressure within the substrate tube during deposition. In the process, a valve is used on the exhaust side of the installation for regulating the pressure.

A combination of the aforementioned methods is described in EP 1719739. The closed-loop pressure control is here implemented through several partial currents. These partial currents can be provided both on the gas inlet side and on the outlet side. At least one partial current is merely open-loop-controlled and at least one partial current is closed-loop-controlled. An increase of the internal pressure of the pipe from the beginning to the end is achieved along the length of the pipe, and the closed-loop control allows maintaining a constant outer diameter along the length of the pipe, so that the parameters of the fiber obtained from the blank mold show few deviations. An introduction of glass soot from the discharge system can also be minimized.

US 2013/081430 describes a method where the substrate tube is inflated during at least a part of the internal deposition. Advantageous effects on the geometry of the substrate tube are achieved by increasing the outer diameter so that a twisting and deflection of the substrate tube can be reduced. This results in a more uniform deposition so that the fiber parameters stemming from the warped blank mold can be maintained within a significantly narrower tolerance range.

Most of the mentioned methods are adapted to maintain a constant diameter of the blank mold during the coating process. However, the outer diameter has almost no influence on the deposition that occurs inside the tube. These methods therefore lead to undefined and/or strongly varying thicknesses and profiles of individual glass layers deposited on the inside. This results partly in considerable flaws in the refractive index profile. Multi-mode fibers manufactured in accordance with the prior art are therefore meteorologically characterized and correspondingly assigned to quality classes. In so doing, flaws in the refractive index profile have a considerable influence on the proportion of fibers of the individual quality classes. Fewer flaws in the refractive index profile and smaller refractive index deviations provides a higher yield of fibers in the desired quality classes.

SUMMARY

An aspect of the present invention is to improve upon the prior art.

In an embodiment, the present invention provides a method for a defined deposition of a glass layer on an inner wall of a preform for an optical fiber and/or for setting a refractive index profile of the preform for a multi-mode fiber. The method includes providing the preform comprising a cavity and an inner wall which defines an inner diameter of the preform, and spreading a deposition gas at a flow speed (v) in the cavity of the preform so as to provide the defined deposition of the glass layer. The defined deposition is performed at a reduced change in the flow speed $a*\Delta v$, where $a<1$. Based on the defined deposition, a change in the flow speed ($\Delta v$):

$$\Delta v = \frac{4Q}{\pi} \cdot \left( \frac{1}{d_i^2} - \frac{1}{d_{i+1}^2} \right)$$

forms at a volume flow (Q), a first diameter ($d_i$), and a second diameter ($d_{i+1}$).

BRIEF DESCRIPTION OF THE DRAWING

The present invention is described in greater detail below on the basis of embodiments and of the drawing in which:

FIG. 1 shows a highly schematic sectional representation of a processing installation for manufacturing a preform via the method of the present invention.

DETAILED DESCRIPTION

In an embodiment, the present invention provides a method for a defined deposition of a glass layer on an inner wall of a blank mold for an optical fiber and/or for setting a refractive index profile of a blank mold for a multi-mode fiber, wherein a deposition gas spreads at a flow speed (v) in a cavity of the blank mold formed by the inner wall, wherein a change in the speed of the flow:

$$\Delta v = \frac{4Q}{\pi} \cdot \left( \frac{1}{d_i^2} - \frac{1}{d_{i+1}^2} \right)$$

forms at a volume flow (Q), the first diameter ($d_i$) and the second diameter ($d_{i+1}$), wherein the deposition is carried out at a reduced change in flow speed $a*\Delta v$, wherein $a<1$.

The proposed method allows for a minimizing of disruptive effects during creation of a refractive index profile and for the refractive index profile to be set in a targeted manner while open-loop-controlling the refractive index, in particular by specifying the volume flows. This consequently provides a yield of fibers with a specified bandwidth and thus a higher yield of desired quality metrics.

The central idea of the present invention is based in particular on the finding that the change in the speed of flow can be used to set the refractive index profile and thus to maintain an accurate thickness of the profile or of individual layers of the profile. The process parameter that is relevant for open-loop or closed-loop control is therefore the change in flow speed.

The quality (in particular of multi-mode fibers) and the yield of excellent multi-mode fibers is thus provided by the fact that the change in flow speed is a determining process parameter for setting the refractive index and thus the refractive index profile.

Since the flow speed automatically changes along with a reduced inner diameter, particularly in internal deposition methods such as the ones used here, the present invention proposes to reduce these changes in an open-loop process-controlled manner.

Different methods can in principle be used therefor. It is possible to begin with a substrate tube that has a very large inner diameter. This results in a deposited glass mass with a lesser thickness than with a substrate tube with a lesser diameter. As a result, the larger the chosen initial inner diameter, the less the inner diameter is reduced. A greater initial diameter also has advantages with regards to the stability of the substrate tubes. Using substrate tubes with a large initial inner diameter, however, leads to increased process durations during the collapsing process following the internal deposition.

The negative influence of an increased initial inner diameter on the efficiency of the deposition can, however, be much more significant. When using a large inner diameter, the distance between the glass particles formed in the reaction area inside the tube and the tube wall on which they must be deposited is considerably greater. The deposition rate thus decreases substantially, and a large part of the glass soot is discharged at the end of the substrate tube. This glass soot cannot be found in the subsequent blank mold and/or fiber and must be cleaned and disposed of at great expense. The amount of gas that is provided for the internal deposition can also be increasingly reduced.

The volume flow is thus reduced and at least partially compensates for the reduction of the inner diameter. Since the relevant total volume flow consists of a plurality of partial volume flows, a reduction can be achieved by reducing individual partial volume flows, which leads to a change in the composition of the reaction mixture, or all the partial volume flows are reduced by the same amount, thus, however, also reducing the partial volume flows of the raw materials forming the glass. This in turn leads to a reduced rate of deposition. This results in the below described problems, which is solved by the present invention.

For a better efficiency of the inner deposition, the inner diameter should be kept as small as possible. For a better stability of the process and quality of the refractive index profile, the inner diameter should be kept as large as possible. This results in an optimal inner diameter, which takes both the efficiency of the deposition and the quality of the profile into account. Depending on the refractive index to be achieved and the required amount of doping agent, respectively, various optimal inner diameters can exist for each layer. The present invention therefore uses an initial substrate tube whose inner diameter has a specific value, with an optimal inner diameter being subsequently set for each layer.

Certain terms are thereby defined as set forth below.

The "method" according to the present invention comprises all inner deposition methods for blank molds. These inner deposition methods include, for example, modified chemical vapor deposition (MCVD), furnace chemical vapor deposition (FCVD), and plasma chemical vapor deposition (PCVD). Glass-forming substances and, for example, doping agents, are ultimately deposited on the inner wall and then correspondingly glazed by applying heat. The various inner deposition methods in particular differ in the manner in which the blank mold is heated.

"Deposition of a glass layer" must be understood in particular as a reduction of the inner diameter by deposition and thus a condensation of a gaseous glass material on the inner wall of the blank mold. A glass layer in this regard more specifically comprises a layer with a largely uniform refractive index.

In "inner wall" of a blank mold is more specifically the part on the inside of the tube where the deposition of the glass layer takes place. The inner wall in this respect is a planar structure on which the individual glass elements from the gas are deposited.

A "blank mold" is in particular also referred to as a "preform". This blank mold forms the basis for a glass fiber and is, for example, drawn into an optical fiber after collapsing. Other process steps can be carried out between the collapsing process and the fiber drawing process depending on the desired type of fiber. More specifically, additional glass layers can be applied onto the blank mold. This allows for adjusting the ratio between the core diameter and the sheath diameter. Other doped layers are applied onto the blank mold for certain types of fibers so that additional properties, for example, a resistance to bending, can be achieved.

The term "optical fiber" includes both mono-mode fibers and multi-mode fibers, which are correspondingly used in telecommunications. Multi-mode fibers are in particular used over short transmission distances. These fibers generally have a core diameter of 50 µm to 62.5 µm. Such multi-mode fibers generally have a defined refractive index profile so that, for example, all modes can propagate through the fiber without a time delay. Such a "refractive index profile" is generally of the gradient index type.

A "flow speed (v)" is more specifically the speed at which the deposition gas is guided through the blank mold.

The "change in flow speed ($\Delta v$)" is more specifically the change of speed of the flow speed of the deposition gas caused, for example, by the change of the inner diameter. The change in flow speed can be influenced in various manners. The inner diameter can, for example, be increased or the composition of the deposition gas can, for example, be changed.

A "volume flow (Q)" is more specifically the volume of a deposition gas that moves within a period of time through the cross-section (in particular the cross-sectional area of the blank mold interior) in relation to a period of time.

In the present invention, both the "first diameter ($d_i$)" and the "second diameter ($d_{i+1}$)" refer to the diameter that has no influence on the composition of the deposition gas and/or on the inner diameter. In this regard, the first diameter ($d_i$) is more specifically the diameter that exists before the deposition of the glass layer, and the second diameter ($d_{i+1}$) is the diameter that exists after the deposition of the glass layer. Intermediate values or several layers together are also, for example, included.

The quantity "a" is more specifically a measure for the extent to which the change in flow speed is reduced by influencing the process parameters. In the ideal case, a=0, since the flow speed is thus kept constant and there is no change in flow speed. However, values above 0 and below 1 can also be tolerated, in particular in the case of very small inner diameters since these still allow for providing a defined refractive index profile of sufficient quality.

In an embodiment of the present invention, a<0.95 or a<0.9 or a<0.8 or a<0.7 or a<0.6 or a<0.4 or a<0.35.

An expansion of an inner diameter can be carried out in order to reduce the change in flow speed ($\Delta v$). To this end, the inner diameter can be expanded, for example, by a differential pressure between the cavity and a process chamber and/or by changing a rotational speed of the blank mold.

The blank mold is generally processed in a rotating glass lathe. Particularly in cases in which a gas flame heats the blank mold, the heat treatment is carried out while the blank mold rotates. The rotation is applied to the blank mold, for example, by the glass lathe. The main focus thereby lies on providing a homogenous heat distribution, wherein, above a rotational speed that provides a homogenous heat distribution, the inner diameter can be further expanded in an open-loop-controlled manner in accordance with the present invention via centrifugal forces.

An optimal flow speed change ($\Delta v$) can also be set for each layer to be deposited.

According to the present invention, an "optimal" inner diameter is an inner diameter with which a sufficiently small deviation of the refractive index can be achieved. This deviation can be calculated from the required bandwidth. An optimal inner diameter is furthermore also based on the deposition efficiency. This refers to the amount of glass mass that is deposited on the inner wall of the tube in relation to the amount of glass-forming substances used. The optimal inner diameter results from the combination of maximum deposition efficiency (whereby in general a higher deposition efficiency is achieved the smaller the inner diameter) while respecting the maximum tolerable refractive index deviation (which is generally smaller at larger inner diameters).

It is particularly advantageous to carry out the method in a process chamber that has a defined pressure. This pressure can be identical to the atmospheric pressure or is adapted to the requirements of the interior deposition method. It is also possible to set a defined pressure inside the cavity of the blank mold. When using the MCVD/FCVD method, the work is generally carried out under atmospheric pressure; in the case of PCVD, the work is carried out under a negative pressure. Since the pressure slowly decreases in the process chamber or increases in the cavity of the blank mold as more glass layers are deposited, the cavity, and thus the blank mold, are expanded. This expansion leads to an increase of the inner diameter, which in turn reduces the change in flow speed change ($\Delta v$).

A change of a composition of the deposition gas can also have an influence on the flow speed (v) and thus on the flow speed change ($\Delta v$). This is also used in the present invention. The deposition gas is thereby composed of different gases, such as, for example, a transport gas, the actual glass gas that is deposited, the doping agents, and other components.

In an embodiment of the method of the present invention, the volume flow (Q) of the deposition gas can, for example, be changed.

The volume flow of the deposition gas commonly amounts to 5 L/min. This volume flow can, for example, be continuously or discontinuously reduced to 2 L/min during the deposition process.

The change in flow speed ($\Delta v$) can thus be set according to the needs through the interaction of the changed volume flow, the changed composition, and the exertion of influence onto the inner diameter.

A determination of the inner diameter can be carried out in order to be able to better set the refractive index profile.

This refers to the current inner diameter, which is determined based on the defined process parameters.

The determination of the (current) inner diameter is carried out in this respect in particular by measuring a concentration of specific gasses, for example, the gas that is deposited, at an inlet, and carrying out a determination of a concentration at an outlet. Since glass has been deposited on the inner wall of the blank mold on the way from the inlet to the outlet, the thickness of the deposited glass layer can thereby be inferred. Since the initial diameter is known, the current inner diameter can in particular be determined by adding. This method is entirely independent of the actual method according to the present invention and can consequently be used for all inner deposition methods for blank molds and glass cylinders.

The determination of the concentration can be carried out, for example, using an infrared spectrometer (IR-spectrometer) by inferring the concentration from the ratio between two peaks, for example, wherein a peak refers to the deposited gas. Other methods, such as, for example, mass-spectroscopic methods, can also be used.

The inner diameter can also be determined directly by measurement, for example, by laser measurement.

In order to achieve an optimized result, the guidance of the change in flow speed can be close-loop-controlled via the determined inner diameter. The pressure difference between the processing chamber and the cavity can, for example, be adapted in accordance with the inner diameter, and/or the rotational speed of the blank mold can be adjusted in accordance with the measured inner diameter. In parallel or additionally, it is also possible to adjust the volume flow or the composition of the deposition gas.

The inner diameter to be adjusted can, for example, be a function of the desired concentration of doping agent in the layer to be deposited. In the case of a graded index profile whose refractive index changes with every layer, an inner diameter that is optimal for deposition is thus set.

When manufacturing blank molds for fibers with a constant refractive index (step-index profile), an optimal inner diameter can thus be determined and this inner diameter is kept constant for the duration of the deposition. This can be achieved by adapting the enlargement of the inner diameter to the thickness of the deposited layers so that the two effects compensate for each other and the flow speed can be kept constant.

In an embodiment of the present invention, it is also possible to adjust the inner diameter with regard to a reaction temperature. Because of the deposition, the wall thickness of the tube to be coated continuously increases, the output of the burner must therefore be increased in order to generate a constant reaction temperature inside the tube. This can be counteracted when an increase of the inner diameter is carried out using the method according to the present invention so that the wall thickness does not change, or changes significantly less than, for example, with a constant outer diameter. A significant change of the burner output is thus avoided.

In order to ultimately obtain a glass fiber, for example, for telecommunications, the blank mold can be further processed into a glass fiber, in particular into a multi-mode fiber.

These multi-mode fibers in particular have a graded refractive index profile which was set in a defined manner by the process parameter Δv.

The present invention also provides a blank mold or a glass fiber manufactured according to the previously described method.

The present invention also provides a communication system that comprises a previously-described glass fiber.

The present invention will be described in greater detail below based on an exemplary embodiment shown in the drawing.

FIG. 1 shows a processing installation 101 which comprises a processing chamber 102 and a glass lathe 103. Two blank mold holders 105 are disposed across from each other on the glass lathe 103. The blank mold is clamped between the blank mold holders 105 as a glass cylinder 107. This glass cylinder 107 has a cavity 109. The inner diameter 110 of the cavity 109 is initially 26 mm. The outer diameter is 29 mm.

In the present case, a modified chemical vapor deposition (MCVD) is carried out during which an oxyhydrogen burner 111 moves back and forth on a rail 113 and applies a suitable heat (energy) to the glass cylinder 107.

The cavity 109 of the glass cylinder 107 has an associated gas inlet 115. The gas inlet 115 is connected with a number of storage containers by way of an optional mixing chamber. The glass-forming substance (as a rule SiCl$_4$) is provided in the storage container 119 at a defined temperature and traversed by a carrier gas. The dosage is carried out by way of suitable dosing systems, such as, for example, MFCs (Mass-Flow-Controller). Other substances are stored in the other storage containers 121. These substances are volatile compounds of the desired doping agents. POCl$_3$, GeCl$_4$, BCl$_3$ are here frequently used. Other gases (transport gases, inert gases, caustics, doping agents etc.) can also be supplied via gas pipes (not shown in FIG. 1).

The flow rate and the respective concentration of the various substances can be adjusted by suitable open-loop-controllable pressure reducers.

An IR-spectrometer 123 is also disposed at the gas inlet 115. This IR-spectrometer 123 determines the spectra of the deposition gas that is fed through the gas inlet 115 into the cavity 109 of the glass cylinder 107.

A gas outlet 117 is disposed on the opposite side. This gas outlet 117 also includes an IR-spectrometer 125 which spectroscopically determines the composition of the gas in the gas outlet 117.

A deposition gas is introduced into the glass cylinder 107 with a total volume flow of 5 L/min. The pressure inside the process chamber 102 is 1 bar. The inner pressure in the cavity 109 of the glass cylinder 107 is also 1 bar at the beginning of the deposition.

The deposition gas is now fed through the gas inlet 115 into the cavity 109 of the glass cylinder 107, and the spectra of this gas are determined in advance by the IR-spectrometer 123. The oxyhydrogen burner 111 also travels back and forth along the travel rail 113 and, in doing so, heats the rotating cylinder and glazes deposited soot into glass.

The spectra 125 are also determined at the gas outlet 117. Based on the decrease in concentration of the glazed gas, the concentration ratio relative to the transport gas is determined by the IR-spectrometer 125, and the thickness of the deposited glass in the glass cylinder 107 is inferred. The thickness of the deposited glass is determined in accordance with the decrease in concentration.

The pressure in the processing chamber 102 is also correspondingly reduced so that a compensation of the reduction of the inner diameter caused by the deposition occurs.

This is repeated for every glass layer, wherein the composition of the deposition gas is additionally adapted to respective needs.

The present invention is not limited to embodiments described herein; reference should be had to the appended claims.

LIST OF REFERENCE NUMERALS

101 Process installation
102 Process chamber
103 Glass lathe
105 Blank mold holder
107 Glass cylinder
109 Cavity
110 Inner diameter
111 Oxyhydrogen burner
113 Travel rail
115 Gas inlet
117 Gas outlet
119 Gas bottle
121 Gas production oven
123 Inlet-IR-spectrometer
125 Outlet-IR-spectrometer
127 Environment

What is claimed is:

1. A method for a defined deposition of a glass layer on an inner wall of a preform for an optical fiber and/or for setting a refractive index profile of the preform for a multi-mode fiber, the method comprising:
   providing the preform comprising a cavity and an inner wall, the inner wall defining an inner diameter of the preform; and
   spreading a deposition gas at a flow speed (v) in the cavity of the preform so as to provide the defined deposition of the glass layer, the defined deposition being performed at a reduced change in the flow speed a*Δv, where a<1,
   wherein,
   based on the defined deposition, a change in the flow speed (Δv):

$$\Delta v = \frac{4Q}{\pi} \cdot \left( \frac{1}{d_i^2} - \frac{1}{d_{i+1}^2} \right)$$

forms at a volume flow (Q), a first diameter ($d_i$), and a second diameter ($d_{i+1}$).

2. The method as recited in claim 1, wherein a is <0.95, <0.9, <0.8, <0.7, <0.6, <0.4, or <0.35.

3. The method as recited in claim 1, wherein,
   the first diameter ($d_i$) is the inner diameter of the preform before the defined deposition of the glass layer, and
   the second diameter ($d_{i+1}$) is the inner diameter of the preform after the defined deposition of the glass layer.

4. The method as recited in claim 1, wherein,
the spreading of the deposition gas at the flow speed (v) in the cavity of the preform so as to provide the defined deposition of the glass layer is performed more than once, and
the change in the flow speed ($\Delta v$) is set for each glass layer to be deposited.

5. The method as recited in claim 1, further comprising:
modifying the change in the flow speed ($\Delta v$) by expanding the inner diameter.

6. The method as recited in claim 5, further comprising:
rotating the preform with a rotational speed during the spreading of the deposition gas at the flow speed (v) in the cavity of the preform so as to provide the defined deposition of the glass layer,
wherein,
the preform is arranged in a process chamber, and
the expanding of the inner diameter is performed by at least one of,
providing a differential pressure between the cavity and the process chamber, and
changing the rotational speed of the preform.

7. The method as recited in claim 1, further comprising:
changing a composition of the deposition gas.

8. The method as recited in claim 1, further comprising:
changing the volume flow (Q) of the deposition gas.

9. The method as recited in claim 1, further comprising:
determining the inner diameter so as to obtain a determined inner diameter.

10. The method as recited in claim 9, wherein,
the performing of the change in the flow speed ($\Delta v$) is carried out in a closed-loop in a controlled manner based on the determined inner diameter.

11. The method as recited in claim 1, further comprising:
further processing the preform into a glass fiber.

12. The method as recited in claim 1, wherein the glass fiber is a multi-mode fiber.

* * * * *